(12) United States Patent
Gavrilescu et al.

(10) Patent No.: US 8,190,670 B2
(45) Date of Patent: May 29, 2012

(54) WEB SITE COBROWSING

(75) Inventors: Alexandru Gavrilescu, Redmond, WA (US); Noel W. Anderson, Bellevue, WA (US); Harpal Bassali, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 3010 days.

(21) Appl. No.: 09/681,488

(22) Filed: Apr. 16, 2001

(65) Prior Publication Data

US 2002/0198941 A1    Dec. 26, 2002

(51) Int. Cl.
    *G06F 15/16* (2006.01)
(52) U.S. Cl. .................. 709/203; 709/217; 709/223
(58) Field of Classification Search .................. 709/204, 709/203, 208, 209, 225, 227, 230, 248, 205, 709/206, 217, 219, 223, 224
See application file for complete search history.

(56) References Cited

U.S. PATENT DOCUMENTS

| | | | | |
|---|---|---|---|---|
| 5,941,957 A * | 8/1999 | Ingrassia et al. | ............... | 709/248 |
| 5,944,791 A * | 8/1999 | Scherpbier | .................. | 709/218 |
| 6,006,253 A * | 12/1999 | Kumar et al. | ................. | 709/204 |
| 6,219,679 B1 * | 4/2001 | Brisebois et al. | ........... | 715/501.1 |
| 6,230,171 B1 * | 5/2001 | Pacifici et al. | ............... | 715/512 |
| 6,240,444 B1 * | 5/2001 | Fin et al. | ........................ | 709/205 |
| 6,298,356 B1 * | 10/2001 | Jawahar et al. | ............... | 707/201 |
| 6,442,550 B1 * | 8/2002 | Rajamony | ........................ | 707/10 |
| 6,510,439 B1 * | 1/2003 | Rangarajan et al. | .......... | 707/201 |
| 6,535,912 B1 * | 3/2003 | Anupam et al. | ............... | 709/217 |
| 6,564,261 B1 * | 5/2003 | Gudjonsson et al. | ......... | 709/227 |
| 6,571,245 B2 * | 5/2003 | Huang et al. | ..................... | 707/10 |
| 6,651,105 B1 * | 11/2003 | Bhagwat et al. | .............. | 709/239 |
| 6,654,785 B1 * | 11/2003 | Craig | ............................ | 709/203 |
| 6,657,990 B1 * | 12/2003 | Dilip et al. | ..................... | 370/352 |
| 6,675,216 B1 * | 1/2004 | Quatrano et al. | ............. | 709/229 |

\* cited by examiner

*Primary Examiner* — Lashonda Jacobs
(74) *Attorney, Agent, or Firm* — Perkins Coie LLP

(57) ABSTRACT

Cobrowsing web sites by two or more users is disclosed. For a cobrowsing session between a first client of a first user and a second client of a second user, the cobrowsing session is first initiated. The first user browses a web site on the first client. The first client sends to the second client a synchronization message. The synchronization message indicates one or more commands reflecting the browsing performed by the first user. The second client receives the synchronization message, and cobrowses the web site in accordance with the message and its included commands. Cobrowsing continues until the cobrowsing session is terminated. The commands of the synchronization message allow for fine granularity of cobrowsing.

37 Claims, 6 Drawing Sheets

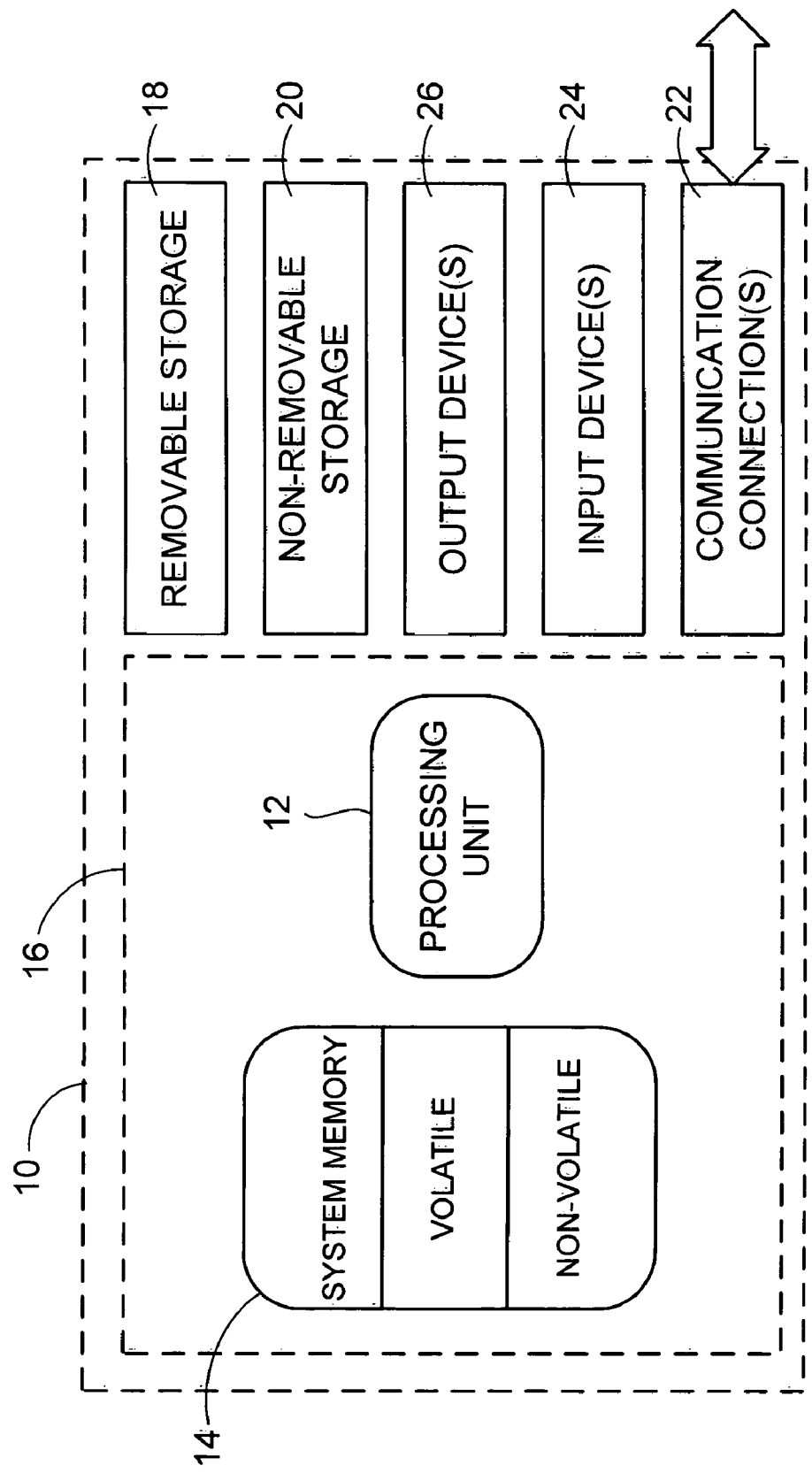

WEB SITE COBROWSING

BACKGROUND OF INVENTION

This invention relates generally to browsing web sites, and more particularly to two or more users cobrowsing web sites concurrently in a synchronized manner.

Browsing the Internet's worldwide web (WWW, or the "web") has become a popular and common activity. Information on the web is typically stored in data files referred to as web pages, which may be formatted according to a markup language, such as the HyperText Markup Language (HTML), and the extensible Markup Language (XML). The web pages are usually organized into web sites. A computer program or software component, referred to as a web browser, allows the user to navigate different web sites, and view different web pages on those web sites. This activity is referred to generally as web browsing.

Web browsing has traditionally been a single user experience. A user starts the web browser on his or her computer, or other computing device, and enters in a web site to begin browsing. The general usefulness of web browsing, however, has led some to introduce cobrowsing. In cobrowsing, as one user browses the web with his or her web browser, other users see the same web pages on their web browsers. That is, the latter users' web browsers are synchronized with the former user's web browser. Cobrowsing is useful in many different situations. For example, in electronic commerce, a customer service representative can cobrowse a merchant's web site with a customer. The representative may lead the cobrowsing session, showing the customer where certain products are described on the web site. Alternatively, the customer may lead the cobrowsing session, going to various pages on the web site, and asking the representative questions about the products displayed on those pages.

Another cobrowsing application is distance learning. In distance learning, a professor may lead a cobrowsing session, such that the students' web browsers are synchronized with the professor's web browser. When the professor posits a question to the students, he or she may then select a student to answer the question, such that the selected student may receive temporary control over the cobrowsing session. Cobrowsing is also useful for recreational purposes, where friends may wish to browse the web together. Technical support is another application for cobrowsing. A technical support adviser can show a user with a computing problem, for example, where to find help on the web.

Current cobrowsing approaches, however, are limited. One common approach is based on the T.120 conferencing standard. In this conferencing approach to cobrowsing, the part of the web page that the user who is leading the cobrowsing session is viewing is saved as a graphics file, such as a bit map file. This graphics file is then sent to the other users, and displayed. As the lead user navigates different parts of the same web page, as well as different web pages, graphics files are continually saved and sent to the other users. This approach is problematic because a large amount of data must be continually sent. Because most users still do not have high bandwidth Internet connections, the resulting cobrowsing session is often very slow. Furthermore, the conferencing approach usually requires that each user participating in the cobrowsing session have the same conferencing application, running on the same operating system.

Another cobrowsing approach is referred to as the hyperlinks approach. In this approach, as the lead user of the cobrowsing session navigates different web pages, the addresses of those web pages, also known as hyperlinks, are sent to the other users. The web browser of each user downloads the web page independently of the other users. This approach overcomes the bandwidth problem of the conferencing approach, since only web page addresses are transferred between the lead user and the other users. However, the hyperlinks approach is disadvantageous in that it is not very granular. Many web pages are very large, and contain a significant amount of information. Usually, a user is interested only in a part of a web page, such that he or she may have to scroll within the web page so that the desired part, containing the desired information, is viewable. Since only the address of the web page is sent to the other users, however, the lead user has no way to indicate which part of the web page is of interest. The granularity of the hyperlinks approach, in other words, is on a web page basis, and does not allow synchronization on a more granular, partial web page basis.

For these and other reasons, there is a need for the present invention.

SUMMARY OF INVENTION

The invention relates to cobrowsing web sites. For a cobrowsing session between a first client of a first user and a second client of a second user, the cobrowsing session is first initiated. The clients of the users can be computers, or other computing devices having web browser software components or web browser computer programs. The first user is initially the leader of the session. He or she browses a web site on the first client. The first client sends to the second client a synchronization message. The synchronization message indicates one or more commands.

The commands indicated by the synchronization message can include, among others:

the current page of the web site being browsed on the first client by the first user;

the current relative position on the current page being navigated and viewed by the first user on the first client;

a portion of the current page as highlighted by the first user on the first client;

a change of focus from a first browser window to a second browser window by the first user on the first client; and, a resizing of the current browser window by the first user on the first client.

Each of these commands, in other words, indicates a browsing action performed by the first user on the first client. The second client receives the synchronization message, and cobrowses the web site in accordance with the message and its included commands. Cobrowsing continues until the cobrowsing session is terminated.

The invention provides for greater cobrowsing granularity than that afforded by the prior art. For example, as the first user scrolls within the current web page to bring an area of interest on the page into view, the synchronization message indicates this scrolling. This causes the cobrowsing of the web site by the second client to correspondingly bring the area of interest into view. As another example, when the user highlights text on the current web page, the synchronization message indicates this highlighting, causing the cobrowsing of the web site by the second client to correspondingly highlight the same text.

The first user can transfer control of the cobrowsing session to the second user. Similarly, the second user can request that control of the cobrowsing session be transferred by the first user to him or her. In one embodiment, the cobrowsing session is initiated, and synchronization messages transferred, in accordance with a preexisting protocol, such as the Session Initiation Protocol (SIP). In another embodiment, the cobrowsing session is initiated in accordance with a first preexisting protocol, and the messages are transferred in accordance with a second preexisting protocol. For example, the first protocol may be the SIP, whereas the second protocol may be the Transmission Control Protocol/Internet Protocol (TCP/IP).

Still other aspects, advantages, and embodiments of the invention, besides those described here, will become apparent by reading the detailed description, and referring to the drawings.

BRIEF DESCRIPTION OF DRAWINGS

FIG. 6 is a diagram of an example computerized device in conjunction with which the invention can be implemented.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Cobrowsing with Increased Granularity

Figure 1:
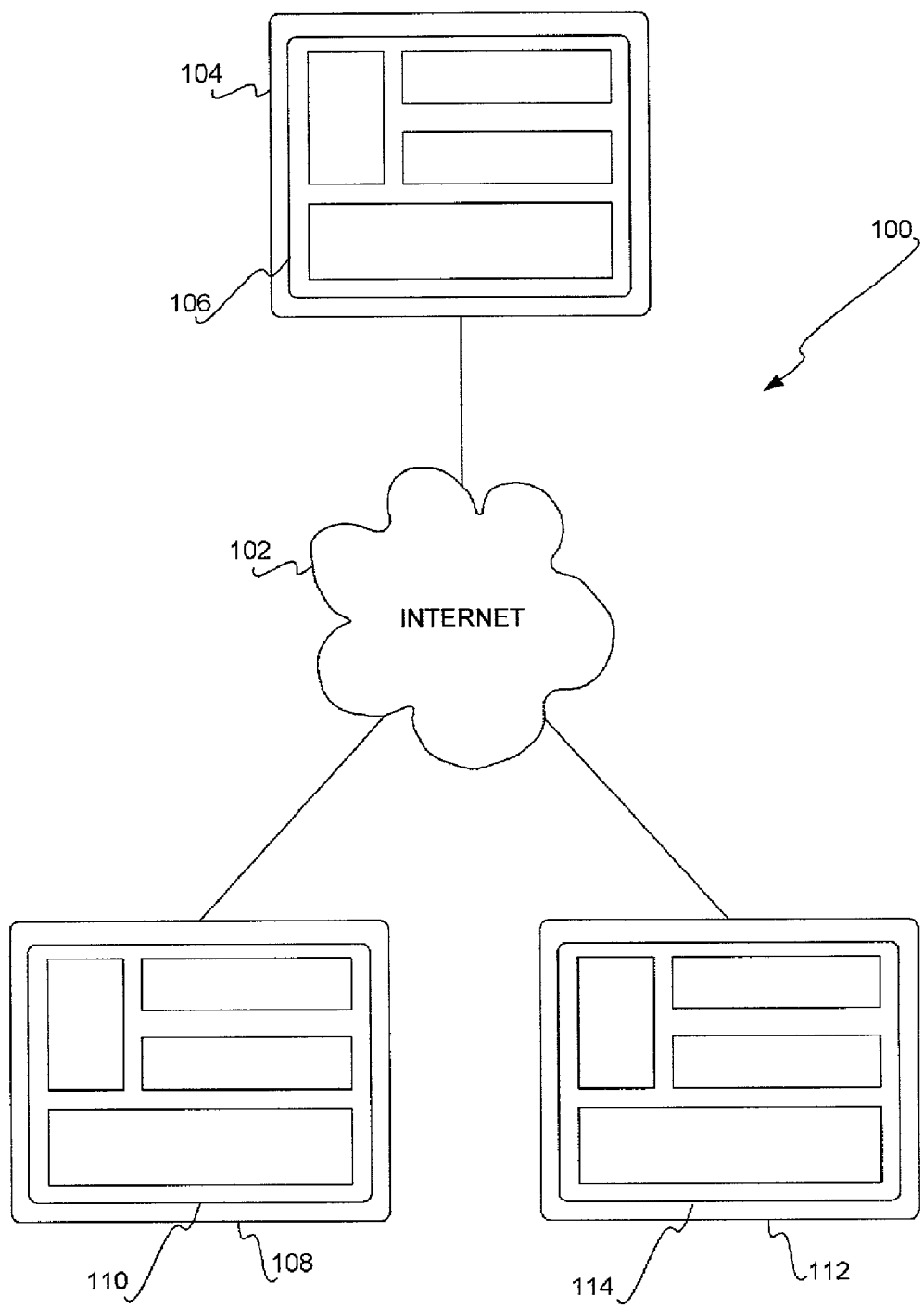
FIG. 1 is a diagram showing cobrowsing among three users in accordance with the invention.

FIG. 1 shows a diagram 100 in which cobrowsing is being performed among the clients of three users. The client 104 has a web browser program or software component running thereon, such that a web browser window 106 is currently being displayed. The client 104 is controlled by a first user, who is presumed to be the leader of the cobrowsing session. The client 104 is communicatively connected to the Internet 102. The second client 108, and the third client 112, are also communicatively connected to the Internet 102. Each of the second client 108 and the third client 112 also has a web browser program or software component running thereon. Each also has a web browser window currently being displayed. Specifically, the second client 108 displays the web browser window 110, whereas the third client 112 displays the web browser window 114. The second client 108 and the third client 112 are controlled by a second user and a third user, respectively.

As the first user navigates web pages and web sites, such that different parts of web pages, different web pages, and different web sites are displayed in the browser window 106, the windows 110 and 114 are synchronized with the same information. That is, as the first user browses within the browser window 106, cobrowsing on the second and third clients 108 and 112 automatically occurs within the browser windows 110 and 114, respectively. Synchronization messages are sent from the first client 104 to the second and third clients 108 and 112, so that the information displayed in the browser windows 110 and 114 are synchronized with the information displayed in the browser window 106. The first user of the first client 104 may also transfer control of the cobrowsing session to either the second user of the second client 108, or the third user of the third client 112.

Figure 2:
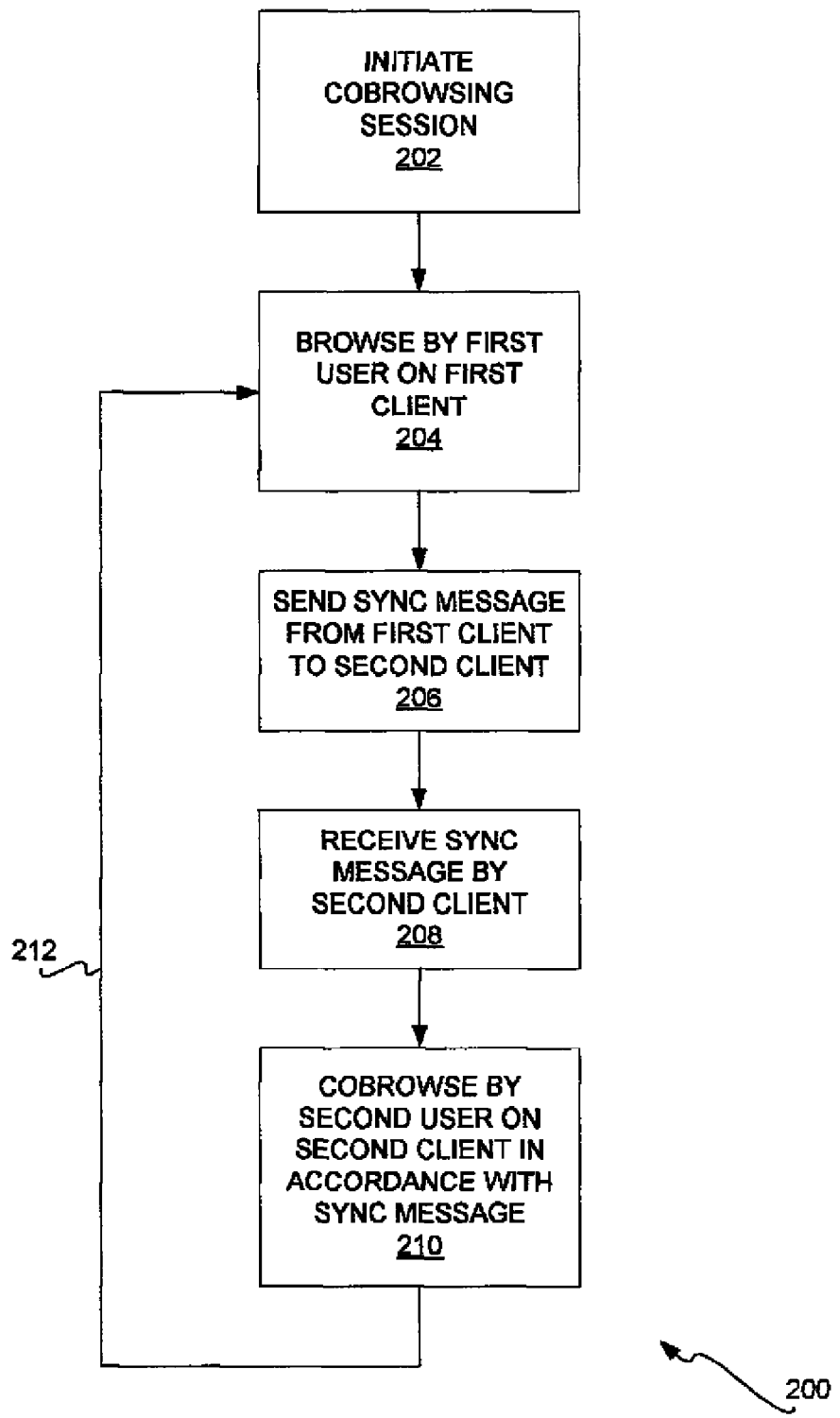
FIG. 2 is a flowchart of a method showing the general approach for cobrowsing in accordance with the invention.

FIG. 2 is a flowchart showing the general method 200 for cobrowsing between a first user and a second user. The method 200 can be extended for cobrowsing among more than two users as well. A cobrowsing session between the first client of the first user and the second client of the second user is initiated (202). The first user browses a web site on the first client (204). This causes a synchronization message to be sent from the first client to the second client, to indicate the browsing by the first user (206). The second client receives the synchronization message (208), and cobrowsing is accomplished by the second user on the second client in accordance with the synchronization message (210). Browsing (204), sending synchronization messages by the first client (206), receiving the messages by the second client (208), and cobrowsing (210) are repeated (212) until the cobrowsing session is terminated.

The synchronization message sent from the first client to the second client includes one or more commands to indicate the browsing by the first user on the first client, so that the second user on the second client can cobrowse in a synchronized manner. One of the commands indicates that the first user has navigated to a new page of a web site. The synchronization message indicates this page by its address. When the second client receives the synchronization message, it causes the current browser window for the cobrowsing session to navigate to this page as well. If no current browser window for the session is open, then a new window is first opened before navigating to the new page.

Figure 3:
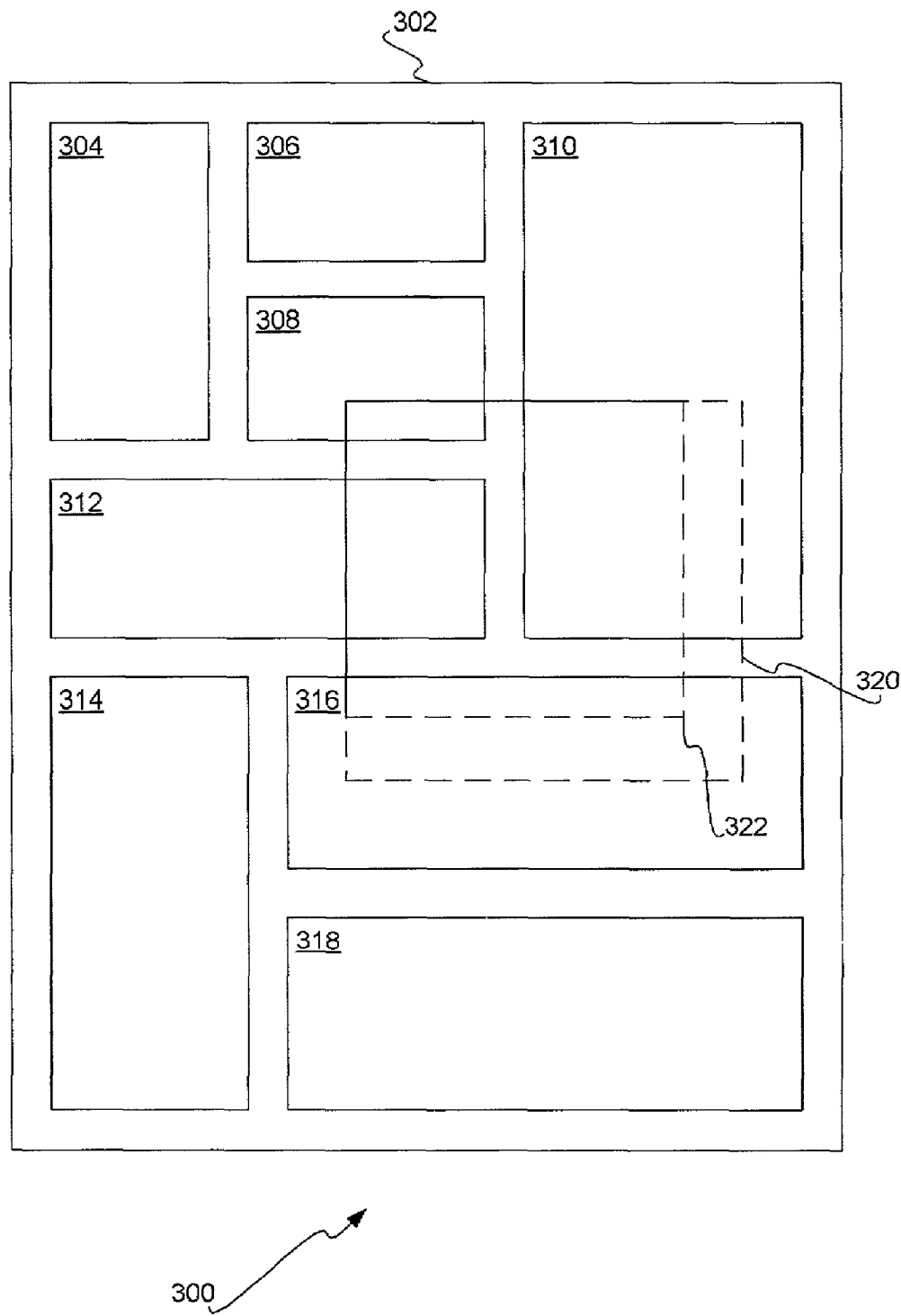
FIG. 3 is a diagram of a web page greater in size than that which browser windows of clients can display.

Another command indicates that the first user has scrolled within the current page vertically and/or horizontally on the first client, such that the current relative position of the current page being navigated and viewed on the first client has changed. For example, as shown in the diagram 300 of FIG. 3, the web page 302 is larger, both horizontally and vertically, than the first browser window 320 of the first client can display. By scrolling horizontally and vertically, the first user effectively moves the first browser window 320 over different parts of the web page 302. The synchronization message indicates this change in the current relative position of the current page being navigated and viewed. When the second client receives the synchronization message, it causes the browser window of the second client to likewise scroll to the same relative position. As shown in FIG. 3, the second browser window 322 of the second client has its top-left corner synchronized over the web page 302 with the first browser window 320 of the first client.

Figure 4:
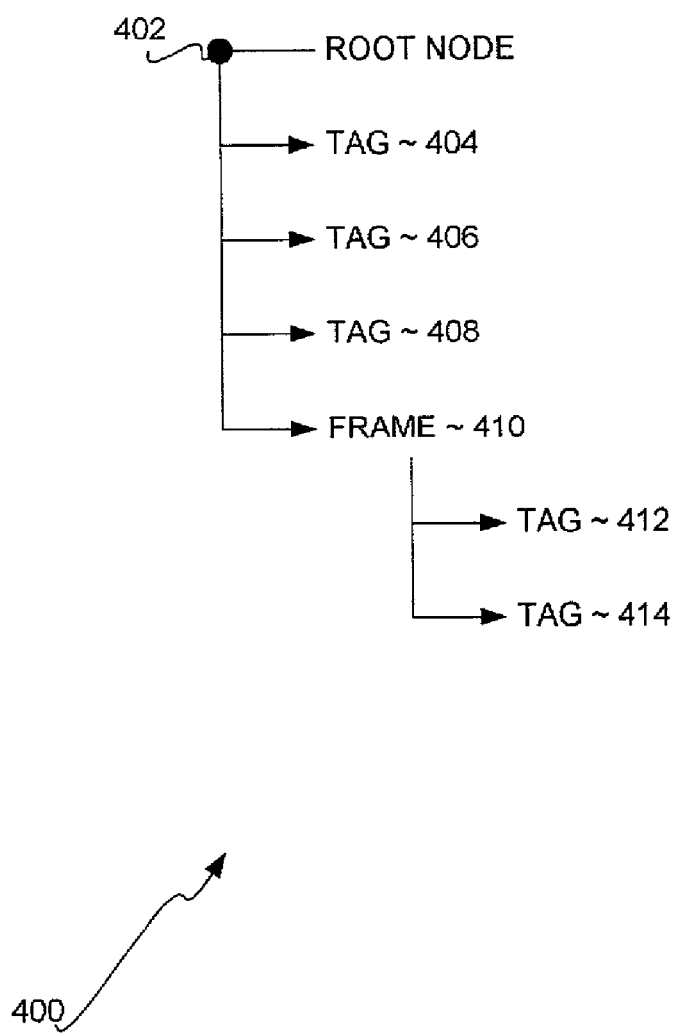
FIG. 4 is a diagram of the page layout of a web page as specified in accordance with the Document Object Model (DOM).

The web page 302 is made up of a number of constituent markup language elements 304, 306, 308, 310, 312, 314, 316, and 318. For example, the elements may be HyperText Markup Language (HTML) elements, eXtensible Markup Language (XML) elements, or different types of elements. The page layout of these elements is preferably specified in accordance with a preexisting page layout specification model, such as the Document Object Model (DOM). DOM is a standard maintained by the World-Wide Web Consortium, also referred to as W3C. More information regarding DOM can generally be found at the Internet web site www.w3.com/dom. FIG. 4 is a diagram 400 showing how an example web page is specified according to DOM. From the root node 402, there are a number of tags 404, 406, 408, each of which specify a different element. Frames, such as the frame 410, can also depend from the root node 402, or from other frames. Each frame also has a number of tags specifying different elements. For example, the frame 410 has the tags 412 and 414.

To indicate the current relative position that has been scrolled to, therefore, the synchronization message first identifies one of the tags in the DOM specification of the current web page. The synchronization message also indicates the relative position within the element specified by the identified tag, as a percentage in each of the horizontal and vertical directions. For example, in the web page 302 of FIG. 3, the synchronization message would identify the tag for the markup language element 308, because the upper left-hand corner of the first browser window 320 is positioned over the element 308. The synchronization message would also identify the percentage down in the vertical direction of the position of the window 320 over the element 308, as well as the percentage right in the horizontal direction of the position of the window 320 over the element 308. When the second client receives this synchronization message, it can then position its second browser window 322 in the same place over the element 308.

The synchronization of the current relative position of the first browser window 320 and the second browser window 322 is preferably accomplished relative to the upper left-hand corners of the windows 320 and 322. This is because the first client may have a different screen size and resolution than that of the second client, such that the first client can show more or less information in its browser window 320 than the second client can in its browser window 322. For example, as shown in FIG. 3, the first browser window 320 is larger than the second browser window 322, indicating that the former has a larger size than the latter. Therefore, even when the windows 320 and 322 are synchronized, the window 320 still shows more of the web page 302 than does the second window 322.

The commands included in the synchronization message can also include a command indicating that the first user on the first client has highlighted a portion of the current page being navigated and viewed. The granularity in highlighting that can be achieved is that a single element of the DOM-specified page layout of the web page can be highlighted. When the second client receives such a synchronization message, it correspondingly highlights the indicated element. Another command indicates that the first user has resized the current browser window on the first client. The resizing is specified by the height and width, in pixels, of the new size of the window. When the second client receives a synchronization message specifying resizing, it correspondingly resizes the browser window on the second client.

Where there is more than one browser window on each client in a given cobrowsing session, usually only one of the browser windows is currently active. This current browser window is said to have focus. For example, the first user may have one browser window to show one web page, and another browser window to show another web page. While browsing, the first user may switch between the windows. This is referred to as changing the focus from one of the windows to the other of the windows. When the first user changes window focus while browsing, a command is sent in the synchronization message to indicate this change in focus. When the second client receives the synchronization message, it correspondingly changes the focus between windows as well.

Finally, another command that can be included in the synchronization message is to transfer control of the cobrowsing session from the first user to the second user. After control has been transferred, the second user becomes the leader of the cobrowsing session, such that his or her browsing actions are reflected in synchronization messages sent to the first client. The synchronization messages cause the cobrowsing activity by the first user on the first client to mirror that of the second user on the second client. The second client may also request that control of the cobrowsing session be transferred from the first user to him or her. If the first user agrees to this request, then control is transferred to the second user from the first user.

Specific implementation of cobrowsing with increased granularity

Figure 5:
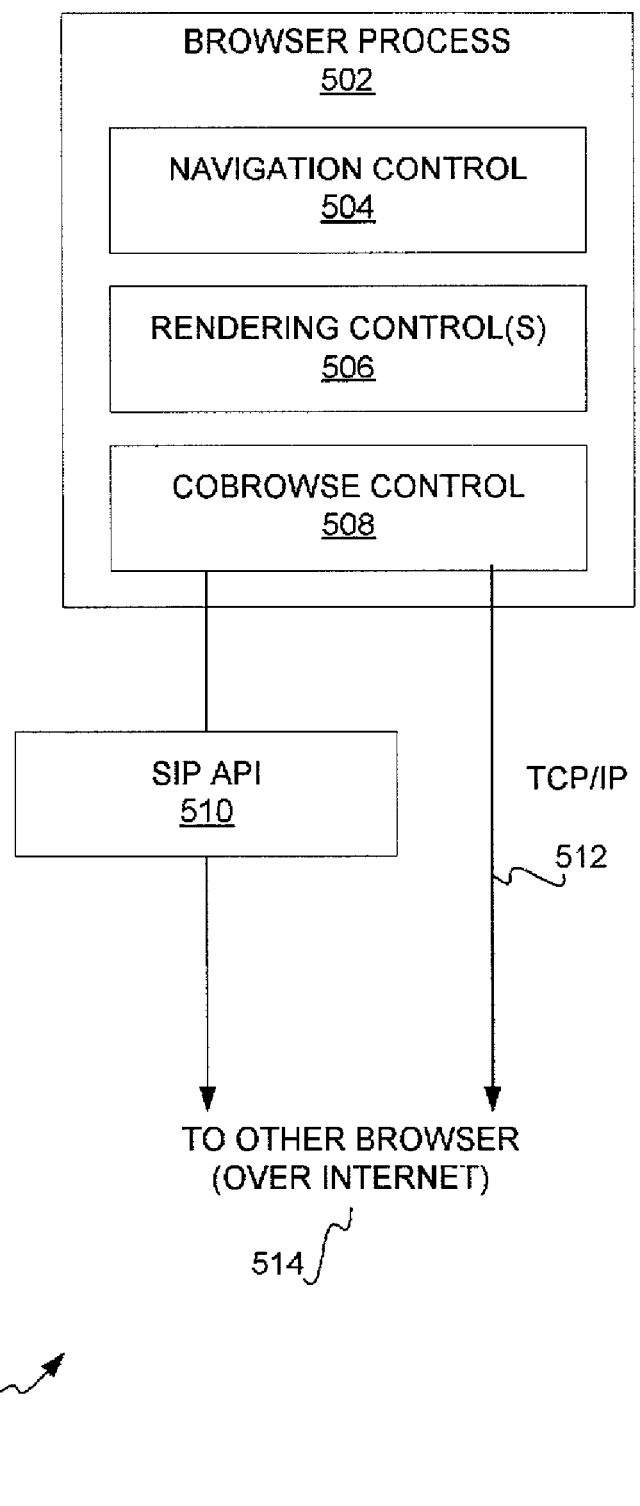
FIG. 5 is a diagram of a system that can implement the invention.

FIG. 5 shows a diagram 500 of parts of a client system, such as a computer or other computing device, that can implement the invention. Specifically, there is a web browser process 502, where a process is a computer program or a part of a computer program. The browser process 502 includes three types of control software components, or software objects: a navigation control 504, one or more rendering control(s) 506, and a cobrowse control 508. The navigation control 504 is the primary control of the browser process 502, and allows the user to navigate web pages. The rendering control(s) 506 render content downloaded by the navigation control 504. There can be, for example, a different rendering control for each type of content downloaded, such as one for HyperText Markup Language (HTML) content, one for extensible Markup Language (XML) content, and so on. The cobrowse control 508 implements the cobrowsing functionality for the browser process 502.

Specifically, where the browser process 502 initiates a cobrowsing session, the cobrowsing control 508 formulates an invitation and sends it to another browser (514) through the Session Interface Protocol (SIP) application programming interface (API) 510. SIP is a protocol for creating, modifying, and terminating sessions with one or more participants. It is maintained by the Internet Engineering Task Force (IETF), and further information regarding SIP is located on the Internet at the IETF's web site in general, and at /ids.by.wg/sip.html in particular. Besides SIP, other preexisting protocols can also be used to establish a cobrowsing session.

Assuming that the invitation is accepted, and that a cobrowsing session results, synchronization messages can subsequently be sent and received in two ways. First, the messages may be sent and received through the SIP API 510. Second, the messages may be sent and received through the Transmission Control Protocol/Internet Protocol (TCP/IP) 512. Alternatively, a different preexisting protocol, other than SIP or TCP/IP, may also be used to send and receive messages. In any case, the messages are ultimately sent to and received from the other browser over the Internet (514).

The initiation of a cobrowsing session using SIP begins with initiation of a SIP session, with cobrowsing as a new media type in the Session Description Protocol (SDP) description of the session. SDP is a protocol intended for describing multimedia sessions for the purposes of session announcement, session invitation, and other forms of multimedia session initiation. It is also maintained by the IETF, and further information regarding SDP is located on the Internet at the IETF's web site in general, and at /rfc/rfc2327.txt in particular. Along with the new media type, the clients can encode in SDP their web browser capabilities. The other clients can then use this information as desired.

The SDP extension that can be used is as follows. The new media type is m=cobrowsing. There are also a number of new media attributes. a=platform:<text> specifies the platform on which the browser program is running. a=browsertype:<text> and a=browserversion:<text> specifies the type of browser, and its version, respectively. a=browserheight:<integer> and a=browserwidth:<integer> specifies the size of the web browser window, height and width, respectively, in pixels. a=colorsdepth:<integer> specifies the number of bits per pixel used for colors on the destination device or buffer. Similarly, a=bufferdepth:<integer> specifies the number of bits per pixel used for colors in the off-screen bit map buffer. a=noimages specifies whether the images have been turned on or off in the web browser. If the attribute is absent, then the images are turned on. If the attribute is present, then the images are turned off. Likewise, a=cookiesdisabled specifies whether client-side cookies are enabled in the browser program. If the attribute is absent, they are enabled, and if it is present, they are disabled. Finally, a=javadisabled specifies whether the Java Virtual Machine (JVM) is enabled in the browser. If the attribute is absent then the JVM is enabled, and if it is present, then the JVM is disabled.

The cobrowsing participants can exchange cobrowsing information by sending SIP requests with a new method, referred to as the cobrowse method. The request universal resource identifier (URI) is a standard SIP universal resource locator (URL) identifying the part to which the message is directed. It contains a to field, a from field, a call-id field, a c-seq number, and a via header. The to field identifies the target of the request. The from field identifies the originator of the request. The call-id field identifies the cobrowsing session. The c-seq number identifies the particular request response transaction.

The cobrowse request may also include a win-id header and/or a URI-id header. The win-id header identifies the browser window in the cobrowsing session. More particularly, the win-id is a general header used to identify the browser window on which the specified command is to be implemented. Each browser window is assigned a unique win-id for identification purposes. The leader client of the cobrowsing session assigns this id at the time the browser window is opened. This is done to direct the cobrowsing commands to the correct window. Both the leader client, as well as the other clients, keep track of the id's, and can specify them in any cobrowsing command. The win-id for each browser window should be uniquely defined in the context of one cobrowsing session, and among all participants. The syntax of the win-id header is: Win-Id=("Win-Id" | "W") integer.

The URI-id identifies the URI-cookie pair in the browser window. A cookie generally is a small data file created by a server, but stored on a client. The URI-id more particularly is a general header used to identify the URI-cookie pair loaded in the main browser window. It is an optimization that, in conjunction with the win-id header, allows the leader client of the cobrowsing session to specify an absolute context for every command that it sends. Each client builds a map of URI-id's to URI-cookie pairs as the leader client defines them. By checking the URI-id of a new command with the URI-id of the currently loaded page, a client can verify whether the proper web page has been loaded. The URI-id is a unique number in the context of a given win-id. When a new browser window is opened within a cobrowsing session, the URI-id is set to zero. As the session progresses, the value of the URI-id for a particular browser window is incremented by one each time a new page is loaded in that browser window. The syntax of the URI-id header is: URI-Id=("URI-id" | "U") ":" integer.

The cobrowse request must also contain a body that contains the cobrowse commands, its parameters, and optionally additional context. The body is formatted in accordance with XML. The syntax of the cobrowse request is: CoBrowse="COBROWSE." The following commands are supported: control, newpage, scroll, highlight, focus, and resize. The syntax of the commands is: CoBrowsingCmd="CONTROL" | "NEWPAGE" | "SCROLL" | "HIGHLIGHT" | "FOCUS" "RESIZE".

The control command has one text parameter, which can be either REQUEST or TRANSFER. The control command is used to transfer session control between two cobrowsing clients. One of the clients is the leader. The other client can ask for control of the session by sending a control request request. The control is transferred only after the leader sends a successful control transfer request. The leader can also voluntarily initiate transfer of the control by sending a control transfer request.

The newpage command is used by the leader client to load a URI in a browser window or frame of the other clients. The message body contains the window or the frame, which loads the new page. The message body also includes the URI itself, and the cookie, if needed, of the page to be loaded. This command can be used to load a new page in an already opened browser window, or its frames, or open a new browser window with the specified page. To open a new browser window, a new win-id is used.

The scroll command is used by the leader client to scroll a particular web browser window of the other clients to a certain position. The message body of this command contains information about the window or frame which that is to be scrolled. The final position after scrolling is specified by the element in that window or frame, and by the percent the element needs to be scrolled. Where no window or frame is specified, the browser window identified by the unique win-id is used. Where the element is not specified, the window or frame scrolls by the percentage specified. In the case where no percent is specified, the window is aligned at the top of the element.

The highlight command is used by the leader client to highlight text in the browser windows of the other clients. The message body of the command contains information about the window or frame and the element containing the text to be highlighted. The focus command is used by the leader client to change the browser window currently in focus at the other clients. Finally, the resize command is used by the leader client to change the browser window size of the other clients. The message body includes the new height and width of the window in pixels.

The message body of the method call includes an XML document, which itself contains a cobrowsing command and its parameters. The XML document is formatted according to the following XML schema.

```
<?xml version="1.0" ?>
<!-- Conforms to XML Data subset for IE 5
<Schema name="Cobrowse dtd" xmlns="urn.schemas-microsoft-com.xml-data"
    xmlns dt="urn.schemas-microsoft-com:datatypes">
    <ElementType name="CoBrowseCommand" content="eltOnly" order="one">
        <element type="CONTROL"/>
        <element type="SCROLL"/>
        <element type="HIGHLIGHT"/>
```

-continued

```
        <element type="NEWPAGE"/>
        <element type="FOCUS"/>
        <element type="RESIZE"/>
    </ElementType>
    <ElementType name="CONTROL" content="empty">
        <AttributeType name="ControlType" dt type="enumeration" dt:values="Request
            Transfer" default="Request"/>
        <attribute type="ControlType"/>
    </ElementType>
    <ElementType name="SCROLL" content="eltOnly" order="seq">
        <element type="Context" minOccurs="0" maxOccurs="1"/>
        <element type="NodeIndex" minOccurs="0" maxOccurs="1"/>
        <element type="ScrollPercent" minOccurs="0" maxOccurs="1"/>
    </ElementType>
    <ElementType name="HIGHLIGHT" content="eltOnly" order="seq">
        <element type="Context"/>
        <element type="NodeIndex"/>
    </ElementType>
    <ElementType name="NEWPAGE" content="eltOnly" order="seq">
        <element type="Context"/>
        <element type="URI"/>
        <element type="Cookie" minOccurs="0" maxOccurs="1"/>
    </ElementType>
    <ElementType name="FOCUS" content="empty"/>
    <ElementType name="RESIZE" content="eltOnly" order="seq">
        <element type="Height"/>
        <element type="Width"/>
    </ElementType>
    <ElementType name="Context" content="eltOnly" order="seq">
        <element type="Frame" minOccurs="0" maxOccurs="*"/>
    </ElementType>
    <ElementType name="NodeIndex" content="eltOnly" order="seq">
        <element type="TagType"/>
        <element type="TagIndex"/>
    </ElementType>
    <ElementType name="ScrollPercent" content="eltOnly" order="seq">
        <element type="TopDownPercent"/>
        <element type="LeftRightPercent" minOccurs="0" maxOccurs="1"/>
        <element type="Align" minOccurs="0" maxOccurs="1"/>
    </ElementType>
    <ElementType name="URI" content="textOnly" dt:type="uri"/>
    <ElementType name="Cookie" content="textOnly" dt:type="string"/>
    <ElementType name="Height" content="textOnly" dt:type="int"/>
    <ElementType name="Width" content="textOnly" dt:type="int"/>
    <ElementType name="TopDownPercent" content="textOnly" dt:type="float"/>
    <ElementType name="LeftRightPercent" content="textOnly" dt:type="float"/>
    <ElementType name="Align" content="empty">
        <AttributeType name="AlignType" dt:type="enumeration"dt:values="AlignTop
            AlignBottom AlignCenter" default="AlignTop"/>
        <attribute type="AlignType"/>
    </ElementType>
    <ElementType name="Frame" content="eltOnly" order="seq">
        <element type="FrameIndex"/>
        <element type="URICookieId"/>
        <element type="URI" minOccurs="0" maxOccurs="1"/>
        <element type="Cookie" minOccurs="0" maxOccurs="1"/>
    </ElementType>
    <ElementType name="FrameIndex" content="textOnly" dt:type="int"/>
    <ElementType name="URICookieId" content="textOnly" dt:type="int"/>
    <ElementType name="TagType" content="textOnly" dt:type="string"/>
    <ElementType name="TagIndex" content="textOnly" dt:type="int"/>
/Schema>
```

Thus, the leader client first sends a newpage cobrowse command containing the URI and cookie, if necessary, of the web page it is viewing. The win-id contains a uniquely assigned identification for the browser window and the URI-id contains a uniquely assigned identification for the URI-cookie pair. On receiving the newpage command, each of the other clients opens a web browser window, associates it with the received win-id, and navigates it to the specified URI and cookie. These clients also associate the URI-id to this URI-cookie pair for future reference.

If the main document includes frames, and the frames are navigated to a different URI than their default, the leader client sends a newpage command for each frame that needs to be synchronized. These requests contain the same win-id and uri-id to show that the command is to be applied in the same browser window, with the same main document. The newpage command contains additional context inside the message body that identifies the frame that needs to navigate to a new URI. If the leader client switches to a new URI in the browser window, it sends a newpage command with the same win-id, but with an incremented uri-id to be associated with the new URI-cookie pair.

The other commands do not change the main document, but rather affect its display. The win-id and uri-id can be used for these commands to identify the context of the browser window. If the action does not occur inside the main window, but rather inside one of the frames, they will provide in the message body additional context containing the frame index and its URI. Any of the clients can request control of the cobrowsing session by sending a control cobrowse command with request as the parameter. However, control is only transferred when the leader sends a control cobrowse command with transfer as the parameter in response.

Example Computerized Device

FIG. 6 illustrates an example of a suitable computing system environment 10 on which the invention may be implemented. For example, the environment 10 can be a client that participates in the cobrowsing session. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10. In particular, the environment 10 is an example of a computerized device that can implement the servers, clients, or other nodes that have been described.

The invention is operational with numerous other general purpose or special purpose computing system environments or configurations. Examples of well known computing systems, environments, and/or configurations that may be suitable for use with the invention include, but are not limited to, personal computers, server computers, handeld or laptop devices, multiprocessor systems, microprocessor systems. Additional examples include set top boxes, programmable consumer electronics, network PCs, minicomputers, mainframe computers, distributed computing environments that include any of the above systems or devices, and the like.

The invention may be described in the general context of computer instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An exemplary system for implementing the invention includes a computing device, such as computing device 10. In its most basic configuration, computing device 10 typically includes at least one processing unit 12 and memory 14. Depending on the exact configuration and type of computing device, memory 14 may be volatile (such as RAM), nonvolatile (such as ROM, flash memory, etc.) or some combination of the two. This most basic configuration is illustrated by dashed line 16. Additionally, device 10 may also have additional features/functionality. For example, device 10 may also include additional storage (removable and/or non-removable) including, but not limited to, magnetic or optical disks or tape. Such additional storage is illustrated in by removable storage 18 and non-removable storage 20.

Computer storage media includes volatile, nonvolatile, removable, and non-removable media implemented in any method or technology for storage of information such as computer readable instructions, data structures, program modules, or other data. Memory 14, removable storage 18, and non-removable storage 20 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Communications connection(s) 22 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 24 such as keyboard, mouse, pen, voice input device, touch input device, etc. Output device(s) 26 such as a display, speakers, printer, etc. may also be included. All these devices are well know in the art and need not be discussed at length here.

The methods that have been described can be computer-implemented on the device 10. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A method for a first user to cobrowse a plurality of pages formatted according to one or more markup languages and organized into one or more web sites with a second user comprising:
   initiating a cobrowsing session between a first client of the first user and a second client of the second user;
   browsing a web site on the first client by the first user;
   sending a synchronization message by the first client to the second client, the synchronization message indicating at least one command comprising an indication of a cookie of the web site;
   receiving the synchronization message by the second client; and
   cobrowsing the web site on the second client by the second user in accordance with the synchronization message, wherein the cobrowsing uses the indication of the cookie to access the web site.

2. The method of claim 1, further comprising repeating browsing on the first client, sending the synchronization message by the first client, receiving the synchronization message by the second client, and cobrowsing on the second client until the cobrowsing session is terminated.

3. The method of claim 1, wherein initiating the cobrowsing session between the first client of the first user and the second client of the second user is in accordance with a preexisting protocol.

4. The method of claim 3, wherein the preexisting protocol is the Session Initiation Protocol (SIP).

5. The method of claim 1, wherein browsing the web site on the first client by the first user comprises browsing a new page of the web site, such that the synchronization message indicates the current page being navigated as the new page.

6. The method of claim 5, wherein cobrowsing the web site on the second client by the second user comprises opening a new browser window for the current page where no other browser window is open for the cobrowsing session on the second client.

7. The method of claim 1, wherein browsing of the web site on the first client by the first user comprises scrolling within the current page at least one of vertically and horizontally such that the current relative position on the current page being navigated and viewed is changed, such that the synchronization message indicates the current relative position as changed, causing cobrowsing the web site on the second client by the second user to correspondingly scroll within the current page.

8. The method of claim 7, wherein the current relative position on the current page being navigated is indicated in accordance with a preexisting model specifying page layout.

9. The method of claim 8, wherein the preexisting model is the Document Object Model (DOM).

10. The method of claim 1, wherein the group of commands further comprises a portion of the current page being highlighted by the first user on the first client, such that the synchronization message indicates the portion of the current page being highlighted, causing cobrowsing the web site on the second client by the second user to correspondingly highlight the portion of the current page.

11. The method of claim 1, wherein the group of commands further comprises a change of focus from a first browser window to a second browser window by the first user on the first client, such that the synchronization message indicates the change of focus, causing cobrowsing the web site on the second client by the second user to correspondingly change focus from a first browser window on the second client to a second browser window of the second client.

12. The method of claim 1, wherein the group of commands further comprises a resizing of a browser window by the first user on the first client, such that the synchronization message indicates the resizing, causing cobrowsing the web site on the second client by the second user to correspondingly resize a browser window on the second client.

13. The method of claim 1, wherein sending the synchronization message and receiving the synchronization message are received in accordance with a preexisting protocol.

14. The method of claim 13, wherein the preexisting protocol is one of: the Session Initiation Protocol (SIP), and the Transmission Control Protocol/Internet Protocol (TCP/IP).

15. The method of claim 1, wherein the synchronization message is formatted in accordance with an extension to a preexisting protocol.

16. The method of claim 15, wherein the preexisting protocol is the Session Description Protocol (SDP).

17. The method of claim 1, further comprising terminating the cobrowsing session.

18. The method of claim 1, further comprising passing control of the cobrowsing session from the first client of the first user to the second client of the second user.

19. The method of claim 18, wherein the group of commands further comprises a transfer of control of the cobrowsing session from the first client to the second client, such that the synchronization message indicates the transfer of control.

20. The method of claim 18, wherein the group of commands further comprises a request to obtain control of the cobrowsing session by the second client from the first client, such that the synchronization message indicates the request to obtain control.

21. The method of claim 18, further comprising:
browsing a web site on the second client by the second user;
sending a synchronization message by the second client to the first client, the synchronization message indicating at least one command selected from the group of commands comprising: a current page of the web site being browsed on the second client by the second user and a current relative position on the current page being navigated and viewed by the second user on the second client;
receiving the synchronization message by the first client; and,
cobrowsing the web site on the first client by the first user in accordance with the synchronization message.

22. The method of claim 21, further comprising repeating browsing on the second client, sending the synchronization message by the second client, receiving the synchronization message by the first client, and cobrowsing on the first client until the cobrowsing session is terminated.

23. A computer-readable medium having a computer program stored thereon for execution by a processor of a first client to perform a method for a first user to cobrowse a plurality of pages formatted according to one or more markup languages and organized into one or more web sites with a second user, the method comprising:
initiating a cobrowsing session between the first client of the first user and a second client of the second user;
browsing a web site on the first client by the first user; and
sending a synchronization message by the first client to the second client, the synchronization message indicating at least one command comprising an indication of a cookie of the web site, wherein the second client receives the synchronization message and cobrowses the web site in accordance with the synchronization message and uses the indication of the cookie when accessing the web site.

24. The medium of claim 23, wherein the method further comprises repeating browsing the web site and sending the synchronization message until the cobrowsing session is terminated.

25. The medium of claim 23, wherein browsing the web site on the first client by the first user comprises browsing a new page of the web site, such that the synchronization message indicates the current page being navigated as the new page.

26. The medium of claim 23, wherein browsing of the web site on the first client by the first user comprises scrolling within the current page at least one of vertically and horizontally such that the current relative position on the current page being navigated and viewed is changed, such that the synchronization message indicates the current relative position as changed, causing cobrowsing the web site on the second client by the second user to correspondingly scroll within the current page.

27. The medium of claim 23, wherein the group of commands further comprises a portion of the current page being highlighted by the first user on the first client, such that the synchronization message indicates the portion of the current page being highlighted, causing cobrowsing the web site on the second client by the second user to correspondingly highlight the portion of the current page.

28. The medium of claim 23, wherein the group of commands further comprises a change of focus from a first browser window to a second browser window by the first user on the first client, such that the synchronization message indicates the change of focus, causing cobrowsing the web site on the second client by the second user to correspondingly change focus from a first browser window on the second client to a second browser window of the second client.

29. The medium of claim 23, wherein the group of commands further comprises a resizing of a browser window by the first user on the first client, such that the synchronization message indicates the resizing, causing cobrowsing the web site on the second client by the second user to correspondingly resize a browser window on the second client.

30. A computer-readable medium having a computer program stored thereon for execution by a processor of a second client to perform a method for a second user to cobrowse a plurality of pages formatted according to one or more markup languages and organized into one or more web sites with a first user, the method comprising:
  initiating a cobrowsing session between a first client of the first user and the second client of the second user;
  receiving a synchronization message by the second client from the first client, the synchronization message indicating at least one command comprising an indication of a cookie; and
  cobrowsing the web site on the second client by the second user in accordance with the synchronization message and using the indication of the cookie when cobrowsing.

31. The medium of claim 30, wherein the method further comprises repeating receiving the synchronization message and cobrowsing the web site until the cobrowsing session is terminated.

32. The medium of claim 30, wherein the first user browses a new page of the web site on the first client, such that the synchronization message indicates the current page being navigated as the new page, and cobrowsing the web site comprises cobrowsing the new page.

33. The medium of claim 30, wherein the first user scrolls within the current page at least one of vertically and horizontally on the first client such that the current relative position on the current page being navigated and viewed is changed, such that the synchronization message indicates the current relative position as changed, and cobrowsing the web site comprises correspondingly scrolling within the current page.

34. The medium of claim 30, wherein the first user highlights a portion of the current page on the first client and the group of commands further comprises the portion of the current page being highlighted by the first user on the first client, such that the synchronization message indicates the portion of the current page being highlighted and cobrowsing the web site comprises correspondingly highlighting the portion of the current page.

35. The medium of claim 30, wherein the first user changes focus from a first browser window to a second browser window on the first client and the group of commands further comprises a change of focus from the first browser window to the second browser window by the first user on the first client, such that the synchronization message indicates the change of focus and cobrowsing the web site comprises correspondingly changing focus from a first browser window on the second client to a second browser window of the second client.

36. The medium of claim 30, wherein first user resizes a browser window on the first client and the group of commands further comprises a resizing of the browser window by the first user on the first client, such that the synchronization message indicates the resizing and cobrowsing the web site comprises correspondingly resizing a browser window on the second client.

37. A method for cobrowsing a plurality of pages formatted according to one or more markup languages and organized into one or more web sites, comprising:
  initiating a cobrowsing session between a first client and a second client;
  browsing a web site on the first client;
  determining using a document object model an action performed at the first client; and
  sending a synchronization message by the first client to the second client, the synchronization message indicating at least one command comprising indications of the determined action and a cookie, the at least one command for causing the second client to cobrowse in accordance with the synchronization message.

* * * * *